United States Patent
Kuchi et al.

(10) Patent No.: US 8,699,446 B2
(45) Date of Patent: Apr. 15, 2014

(54) PRECODING FOR MULTIPLE TRANSMISSION STREAMS IN MULTIPLE ANTENNA SYSTEMS

(75) Inventors: Kiran Kumar Kuchi, Chennai (IN); Deviraj Klutto Milleth Jeniston, Narayanapuram (IN); Vinod Ramaswamy, Chennai (IN); Baskaran Dhivagar, Chennai (IN); Krishnamurthi Giridhar, Chennai (IN); Bhaskar Ramamurthi, Chennai (IN); Dileep Manisseri Kalathil, Malappuram (IN); Padmanabhan Madampu Suryasarman, Chennai (IN)

(73) Assignee: Centre of Excellence In Wireless Technology, Chennai (IN)

( * ) Notice: Subject to any disclaimer, the term of this patent is extended or adjusted under 35 U.S.C. 154(b) by 495 days.

(21) Appl. No.: 12/999,941

(22) PCT Filed: Jun. 18, 2009

(86) PCT No.: PCT/IN2009/000353
§ 371 (c)(1),
(2), (4) Date: Jan. 25, 2011

(87) PCT Pub. No.: WO2009/153810
PCT Pub. Date: Dec. 23, 2009

(65) Prior Publication Data
US 2011/0142003 A1    Jun. 16, 2011

(30) Foreign Application Priority Data
Jun. 18, 2008 (IN) .......................... 1486/CHE/2008
Jan. 7, 2009 (IN) .............................. 31/CHE/2009

(51) Int. Cl.
*H04W 4/00* (2009.01)
*H04J 4/00* (2006.01)

(52) U.S. Cl.
USPC .......................................... 370/330; 370/436

(58) Field of Classification Search
USPC ................................................. 360/330, 436
See application file for complete search history.

(56) References Cited

U.S. PATENT DOCUMENTS

| | | | |
|---|---|---|---|
| 2003/0069043 A1 | 4/2003 | Chhaochharia et al. |
| 2004/0082356 A1 | 4/2004 | Walton et al. |
| 2004/0132496 A1 | 7/2004 | Kim et al. |
| 2005/0100102 A1 | 5/2005 | Gazdzinski et al. |
| 2005/0113142 A1 | 5/2005 | Felter |

(Continued)

OTHER PUBLICATIONS

Vu et al., "Optimal Linear precoders for MIMO wireless correlated channels with nonzero mean in space-time coded systems," in IEEE Transactions on Signal Processing, vol. 54, No. 6, Part 1, pp. 2318-2332, Jun., 2006.

*Primary Examiner* — Afshawn Towfighi
(74) *Attorney, Agent, or Firm* — Rahman LLC

(57) ABSTRACT

Precoding for multiple transmission streams in multiple antenna systems. Embodiments herein disclose a general method that transmits signal from multiple antennas using a one/two dimensional precoder followed by STBC/SFBC or SM encoder. This precoder is fixed in a given resource block (RB) or slot, which is composed of P subcarriers and Q OFDM symbols (where the values for P and Q are greater than or 5 equal to 1). The precoder in each resource block may take same or different values, which span the two dimensional time-frequency grid. The precoder is chosen as a function of either logical frequency index or physical frequency index of the RB.

28 Claims, 10 Drawing Sheets

(56) References Cited

U.S. PATENT DOCUMENTS

| | | |
|---|---|---|
| 2005/0180349 A1 | 8/2005 | Alamouti et al. |
| 2007/0164902 A1 | 7/2007 | Bang et al. |
| 2007/0217539 A1* | 9/2007 | Ihm et al. ............ 375/267 |
| 2008/0031370 A1 | 2/2008 | Guey et al. |
| 2008/0080459 A1* | 4/2008 | Kotecha et al. ............ 370/342 |

* cited by examiner

PRECODING FOR MULTIPLE TRANSMISSION STREAMS IN MULTIPLE ANTENNA SYSTEMS

FIELD OF INVENTION

This invention relates to wireless communications, and more particularly to using multiple transmission antennas in wireless communications.

BACKGROUND OF INVENTION

A wireless network generally comprises of many smaller region called a cell that is further divided in to multiple sectors. Each cell/sector may have a base station (BS) and multiple mobile stations (MSs). The MSs in a sector may be fixed, nomadic or mobile. Communication from a BS to a MS is called as downlink or forward link. Similarly, communication from an MS to a BS is called as uplink or reverse link.

The radio frequency signal transmitted from the BS will travel through multiple paths before reaching the MS or vice versa. This results in the superposition of different multi-path signals, adding constructively and destructively at the receiver. The time varying nature of the mobile channel is due to the multipath time dispersion, doppler shift, and random phase modulation. Resolving the multipaths becomes difficult in system operating at very high carrier frequencies. The un-resolvable multiple paths contribute to fading and the resolvable multiple paths lead to inter-symbol interference (ISI). The presence of these resolved multipath components lead to the frequency selective nature of the wireless channel.

The problem of fading is overcome by providing multiple replicas of the transmitted signal to the receiver(s). This can be done by transmitting same (space-time coded) signals through all transmit antennas during the same time interval or at different time intervals to the receiver and/or by obtaining multiple replicas of the transmitted signal using multiple receivers. This is called as antenna diversity. This will ensure that less attenuated signal is available at the receiver under the assumption that the fading across the antennas are uncorrelated.

Space-time block coding (STBC) is a technique in which the signals to be transmitted will be coded across space (antennas) and time. When the encoding is done across space and frequency resource, it is called space-frequency block coding (SFBC). A STBC scheme with two transmit antennas is described below.

Signal $s_1$ is transmitted through the first antenna and $s_2$ is transmitted through the second antenna in time instant t and signal $-s_2^*$ is transmitted through the first antenna and $s_1^*$ is transmitted through the second antenna in next time instant t+T, where T is the symbol duration. The received signals $r_1$ and $r_2$ in two adjacent time instants is given by $$\begin{pmatrix} r_1 \\ r_2 \end{pmatrix} = \begin{pmatrix} s_1 & s_2 \\ -s_2^* & s_1^* \end{pmatrix} \begin{pmatrix} h_1 \\ h_2 \end{pmatrix} + \begin{pmatrix} n_1 \\ n_2 \end{pmatrix}$$

After complex conjugating the received signal $r_2$, the above equation can be written as $$\begin{pmatrix} r_1 \\ r_2^* \end{pmatrix} = \begin{pmatrix} h_1 & h_2 \\ h_2^* & -h_1^* \end{pmatrix} \begin{pmatrix} s_1 \\ s_2 \end{pmatrix} + \begin{pmatrix} n_1 \\ n_2^* \end{pmatrix}$$

It can be easily shown that the channel matrix is orthogonal, and the receiver processing to detect $s_1$ and $s_2$ is linear. In case of SFBC, two frequency resources in one time instant are used instead of two time instants. It is well known that, rate=1, orthogonal space-time or space-frequency block codes do not exist for more than 2-antennas. A 4-antenna transmit diversity scheme which uses a combination of STBC and phase diversity has been proposed in TDMA type systems. Similarly, combination of STBC and CDD has been used in literature for 4-antenna transmission.

Cyclic delay diversity (CDD) is a scheme in which the cyclic shift of the first antenna is set to zero, while an antenna specific cyclic shift is applied to the remaining antennas. The cyclic shift is done after the N-point IFFT of the OFDM transmitter. The time domain CDD and the frequency domain phase diversity equivalent of a CDD signal is given by $$\underbrace{s(t-\delta_{n_T})}_{CDD\ Signal} = \frac{1}{\sqrt{N}} \sum_{n}^{N-1} \underbrace{e^{-j\frac{2\pi}{N}n\delta_n}S(n)}_{PhaseDiversitySignal} e^{-j\frac{2\pi}{N}nt}$$

Where $\delta_{n_T}$ is the antennas specific delay, N is the size of the IFFT. Note that in CDD the phase is varied on every subcarrier depending on the subcarrier index.

Spatial-multiplexing (SM) is another multi-antenna scheme which utilizes multiple antenna transmission for increasing rate and system capacity. In this scheme, multiple independent data streams are transmitted over spatially separated antennas. The receiver uses spatially separated receiver antennas, and suppresses the inter-stream interference between the transmitted data streams, and detects both streams reliably, thus increasing system capacity and throughput.

SUMMARY OF INVENTION

Accordingly the invention provides a method and system for transmission of a signal stream from a plurality of antennas, the method further comprising steps of creating a plurality of groups of consecutive symbols in the stream; applying a transformation to each of the plurality of groups, wherein each of transformed plurality of groups comprise of elements; creating a matrix T from the elements of each of the transformed plurality of groups, wherein the T is a $N_t \times N_s$ matrix, where $N_t$ is number of elements in the group; applying a precoder to the T to create a $N_t \times N_s$ matrix; mapping columns of $N_t \times N_s$ matrix to a different subcarrier on a plurality of Physical Resource Units (PRUs), the plurality of PRUs having a common time index and a common frequency index; and transmitting rows of the $N_t \times N_s$ matrix on the plurality of antennas, wherein each row of the $N_t \times N_s$ matrix uses a different antenna and wherein each column of the $N_t \times N_s$ matrix is transmitted using a different subcarrier on a Physical Resource Unit (PRU), further wherein the precoder is a matrix of size $N_t \times N_t$, where $N_t$ is number of the plurality of transmitting antennas and further the precoder varies with at least one of the time index, the frequency index and the frequency and time indices.

Also, disclosed herein is a method and system for selection of a precoder for a signal, the method comprising steps of dividing available bandwidth of streams of the signal into frequency partitions, wherein the frequency partition is further divided into a plurality of frequency sub-partitions, each of the frequency sub-partitions comprising of a plurality of Physical Resource Units (PRUs); grouping the plurality of PRUs into sets, wherein each the set comprise of an arbitrary number of PRUs; further classifying the sets into a plurality of sets, where elements of the sets comprises of L physically contiguous PRUs, where L is greater or equal to 1 and L may vary with each of the sets; assigning each element of the sets a logically contiguous index i, wherein i takes values from 0, 1, 2, . . . $N_L-1$ where $N_L$ may vary for each of the sets; determining a precoding matrix W(i,q) of size $N_t \times N_t$ for each element of a set chosen from the plurality of sets, where $N_t$ is number of transmitting antennas; applying a precoding matrix to each element of the set to obtain the precoder.

Embodiments herein disclose a method and system for transmission using $N_t$ transmission antennas comprising of transmitting elements of y simultaneously from the $N_t$ antennas, where y=W(p,q)T, further wherein p is frequency index of y, q is time index of y and W(p,q) is a $N_t \times N_s$ vector and T is a transformer matrix.

The embodiments herein provide an OFDM receiver comprising of a baseband portion, where the OFDM receiver receives a precoded signal comprising of precoded pilot tones and precoded groups of data tones, further where the precoded signal relies on at least one of time index of a subcarrier of the precoded signal; frequency index of the subcarrier; and time and frequency indices of the subcarrier and is transmitted using a plurality of antennas, the baseband portion further comprising of at least one means adapted for estimating channel state information for a group of channels using the precoded pilot tones; estimating interference covariance estimation using the precoded pilot tones; demodulating the precoded data tones; and demodulating the groups of data tones using the channel state information and the interference covariance estimation.

Disclosed herein is a DFT-S-OFDMA receiver comprising of a baseband portion, where the receiver receives a precoded signal comprising of precoded pilot tones and precoded groups of data tones, further where the precoded signal relies on at least one of time index of a subcarrier of the precoded signal; frequency index of the subcarrier; and time and frequency indices of the subcarrier and is transmitted using a plurality of antennas, the baseband portion further comprising of at least one means adapted for estimating channel state information for a group of channels using the precoded pilot tones; estimating interference covariance estimation using the precoded pilot tones; demodulating the precoded data tones; and demodulating the groups of data tones using the channel state information and the interference covariance estimation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, through out which like reference letters indicate corresponding parts in the various figures. The embodiments herein will be better understood from the following description with reference to the drawings, in which.

DETAILED DESCRIPTION OF INVENTION

Figure 1:
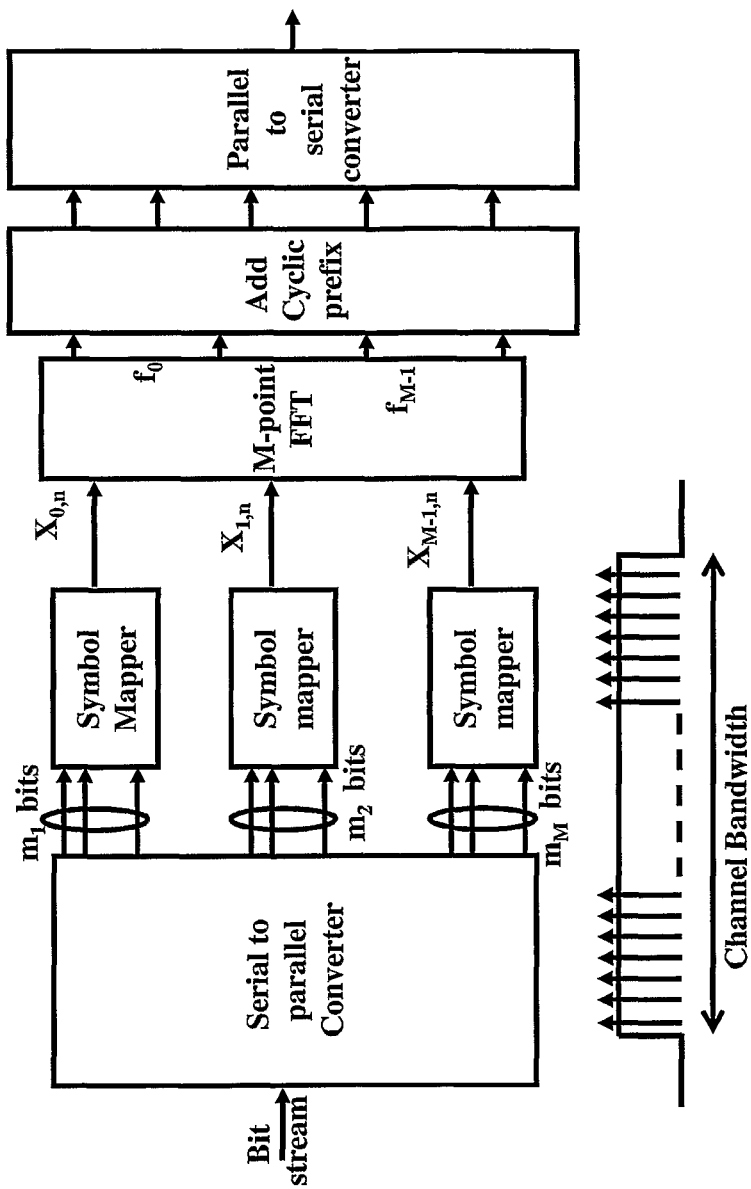
FIG. 1 depicts the block diagram of an OFDMA based system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve transmit diversity and precoding using multiple antennas in wireless networks. Referring now to the drawings, and more particularly to FIGS. 1 through 10, where similar reference characters denote corresponding features consistently throughout the figures, there are shown preferred embodiments.

The IEEE 802.16e Wireless Metropolitan Area Network (MAN) is a broadband wireless standard that uses Orthogonal Frequency Division Multiplexing Access (OFDMA) technology for both downlink and uplink transmissions. The block diagram of an OFDMA based system is shown in FIG. 1.

The physical subcarriers are grouped to form a sub-channel, which comprises of a set of subcarriers. In the downlink, a sub-channel may be intended for different groups of users; in the uplink, a transmitter may be assigned one or more subchannels, several transmitters may transmit simultaneously. The PSK/QAM input data are mapped to distinct subcarriers, and filled with zeros in the unused subcarriers before taking an N-point IDFT. The subcarriers forming one sub-channel may, but need not be adjacent. When they are adjacent, channel dependent scheduling (CDS) can improve the throughput. When they are not adjacent but distributed over the complete bandwidth (for instance, in a pseudo-random fashion that can include fast hopping across the tones), interference from adjacent tones is averaged and frequency diversity is exploited inherently. The total available physical channel is divided into logical sub-channels to support scalability, multiple accesses The distributed resource unit (DRU) contains a group of subcarriers which are spread across the distributed resource allocations within a frequency partition. The size of the DRU equals the size of PRU, i.e., P subcarriers by Q OFDMA symbols. The minimum unit for forming the DRU is equal to either a single subcarrier or a pair of subcarriers, called tone-pair.

The localized resource unit, also known as contiguous resource unit (CRU) contains a group of subcarriers which are contiguous across the localized resource allocations. The minimum size of the CRU equals the size of the PRU, i.e., P subcarriers by Q OFDMA symbols. When the number of PRUs in a CRU is 1 or 2, it is called as a miniband CRU, and when the number of PRUs in a CRU is 3 or more, it is called as a subband CRU. The minibands CRUs available in a frequency partition can be divided into two groups. The first group can be used as miniband CRU itself, and the second group will be used to create subcarrier or pairs of subcarrier permuted distributed resource unit (DRU).

Figure 2:
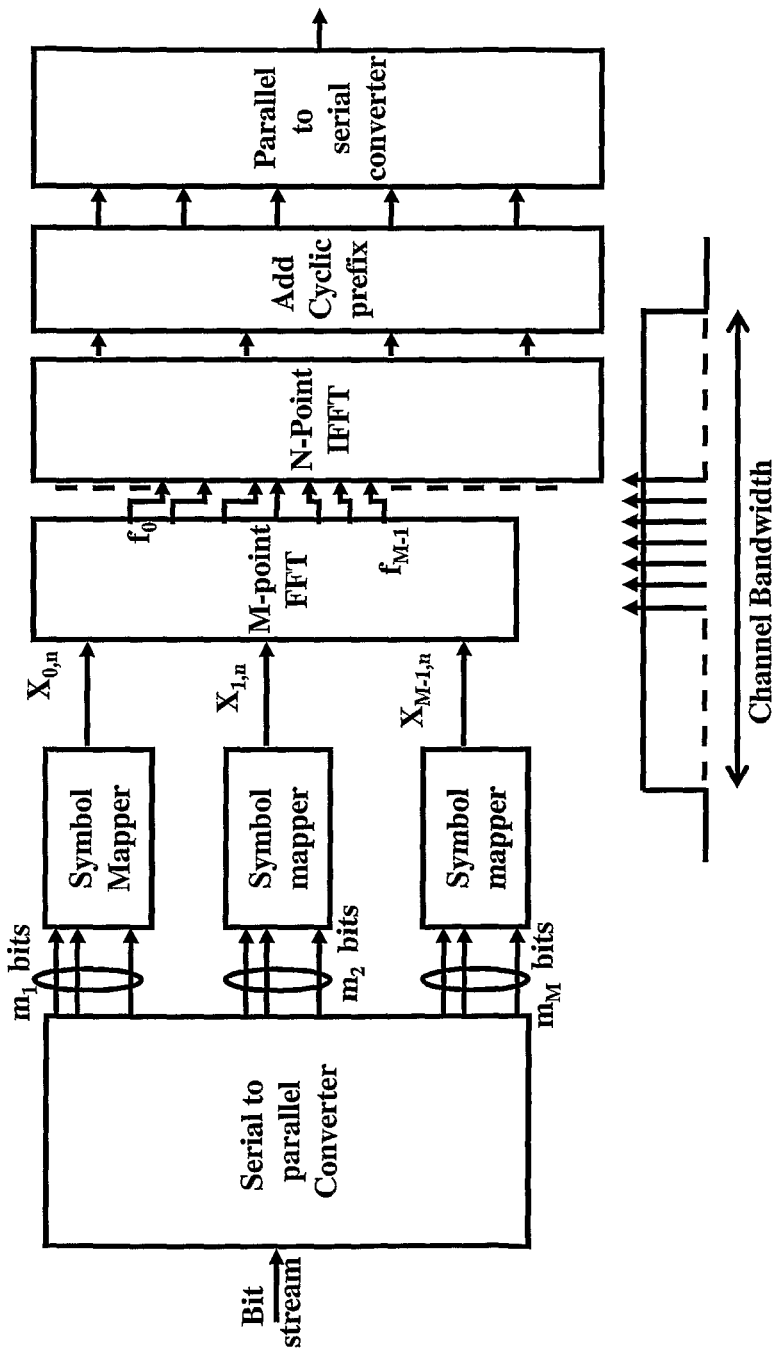
FIG. 2 depicts a localized LTE system using the DFT-S-OFDMA framework, according to embodiments as disclosed herein.
Figure 3:
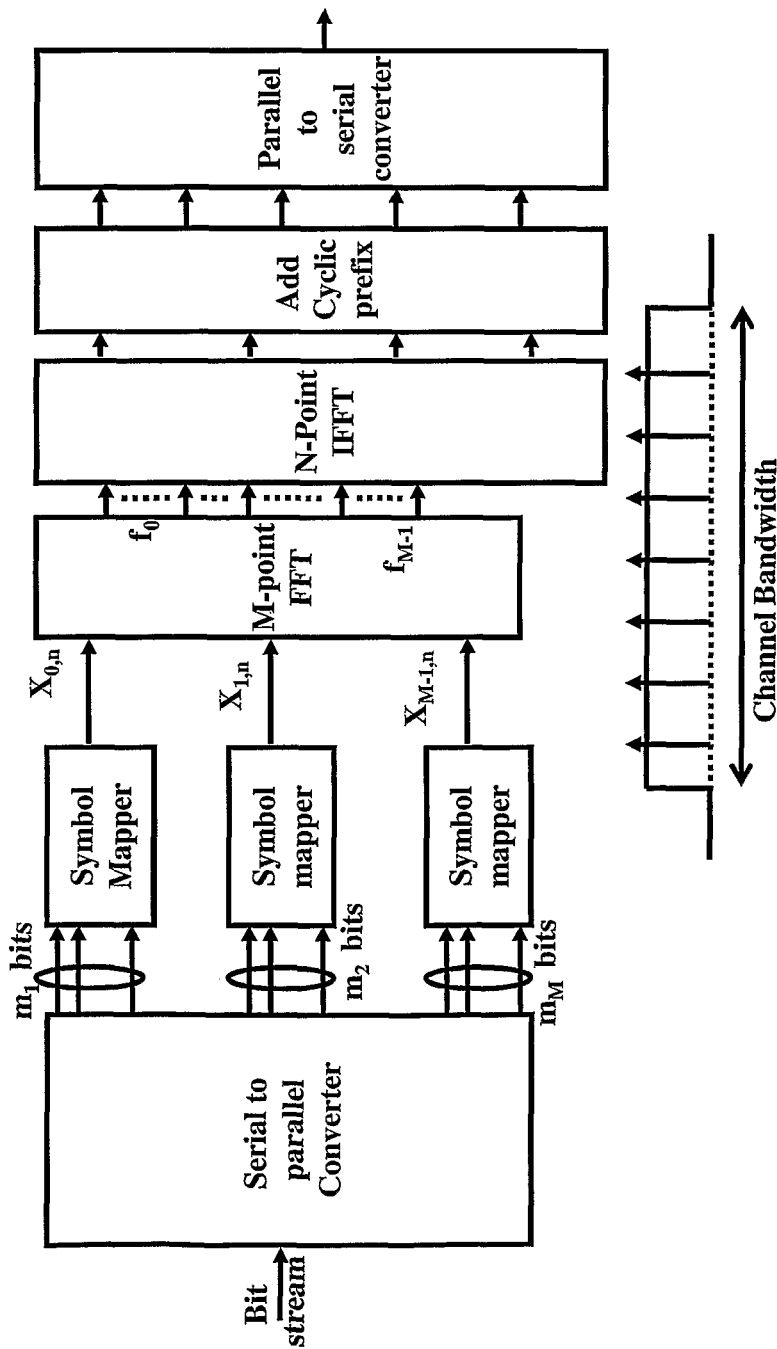
FIG. 3 depicts a distributed LTE system using the DFT-S-OFDMA framework, according to embodiments as disclosed herein.

3GPP-LTE is a standard that uses a variant of OFDMA called as DFT-spread-OFDMA (DFT-S-OFDMA). The frequency domain transmitter implementation of an LTE system using the DFT-S-OFDMA framework is shown in FIG. 2. An M-point FFT is applied to the PSK/QAM input data and the outputs of the FFT are mapped to distinct subcarriers, and filled with zeros in the unused subcarriers before taking an N-point IDFT with N>M. The mapping of subcarriers can be either localized or distributed in frequency domain. The mapping of subcarriers can be either localized as in FIG. 2 or distributed as in FIG. 3.

Figure 4:
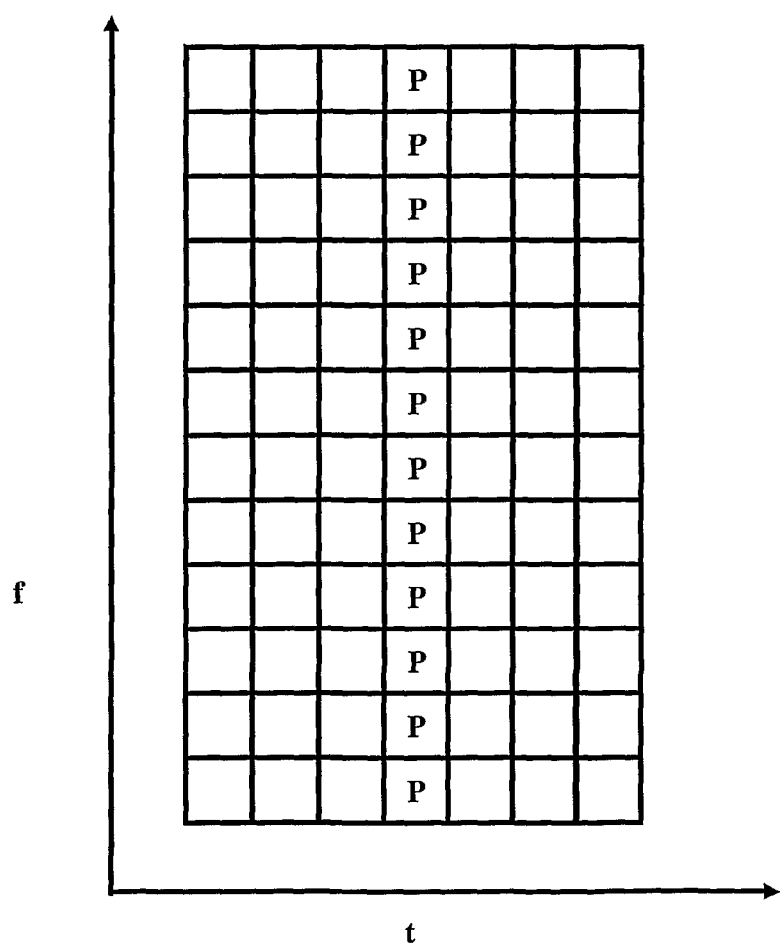
FIG. 4 depicts a typical slot format for localized/distributed SC-FDMA, according to embodiments as disclosed herein.

In the uplink of LTE which uses DFT-S-FDMA, the basic packet resource unit (PRU) which is also called a tile may is composed of P subcarrier and 7 OFDM symbols. A physical resource unit (PRU) is the basic physical unit for resource allocation that comprises P consecutive subcarriers by Q consecutive OFDMA symbols. A Typical value for P is 18 subcarriers and Q is 5 or 6 or 7 OFDMA symbols. A logical resource unit (LRU) is the basic logical unit for distributed and localized resource allocations. An LRU is P.Q subcarriers. The LRU includes the pilot tones that are used in a PRU. The effective number of subcarriers in an LRU depends on the number of allocated pilots. A typical slot format for localized/distributed SC-FDMA, which is used in the 3GPP-LTE standard, is shown in FIG. 4. The slots denoted by P are slots which contain allocated pilots.

A typical slot format for localized/distributed DFT-S-OFDMA comprises of 12*m subcarriers in frequency and 7-OFDM symbols, where "m" is a positive integer. Pilot tones are transmitted in the fourth OFDM symbol. The remaining 6 OFDM symbols are used for transmission of DFT-S-OFDMA data tones. In LTE, pilot symbols do not use DFT spreading. The pilot tones are directly modulated using constant-amplitude-zero-auto-correlation (CAZAC) sequences which has low peak-to-average-power-ratio (PAPR). In DFT-S-OFDMA, the number of allocated tones in a slot is generally an integer multiple of 12. Therefore, in LTE, the uplink slot comprises of P subcarriers in frequency and 7 OFDM symbols.

In LTE, data is typically allocated in pairs of slots which are contiguous in time. Therefore, for channel estimation purposes, the receiver may use two pilot OFDM symbols which are separated in time. A 2D-MMSE channel estimation algorithm can be used to track the channel variation both in frequency and time.

In multi-user systems, resources are allocated in time and frequency dimensions, where the basic signal is confined to one OFDM symbol that spans N subcarriers spanning entire bandwidth.

A basic unit for transmission is a slot which is composed of P subcarriers and Q OFDM symbols. Data is allocated in terms of slots which are either contiguous (localized) or scattered (distributed) in a two dimensional time-frequency grid that contains N subcarriers and M OFDM symbols where (N>>P and M>>Q). P and Q may be greater than one. Each slot is designated by the two dimensional index (p,q) where p is the frequency index and q is the time index and p=1, 2, Nf, q=1, 2, ... Nt. Nt is equal to the total number slots in time axis. Nf is equal to the total number slots in frequency axis. Nt+Nf is equal to the total number of allocated slots. For example slot (1,1) and (1,2) are two adjacent slots in time and slot (1,1) and (2,1) are two adjacent slots in frequency. The size of the basic resource unit in the uplink can be same or different from that of the downlink i.e., the pair P and Q in the uplink can be same or different from that of the downlink.

In a practical system, the frequency slot index p represents the logical set of frequency slots allocated in a given frequency partition. In other words, the index p, may represent physically contiguous frequency slots, or physically non-contiguous (distributed) frequency slots which are scattered in entire frequency band or a given frequency partition.

Q (Q=5 or 6 or 7) OFDM symbols are grouped to form a sub-frame in IEEE 802.16m standards, and there are eight such sub-frames in a 5 millisecond frame. However, 2Q (Q=7) OFDM symbols are grouped to form a sub-frame in 3GPP-LTE standards, and there are 10 such sub-frames in a 10 millisecond frame.

Figure 5:
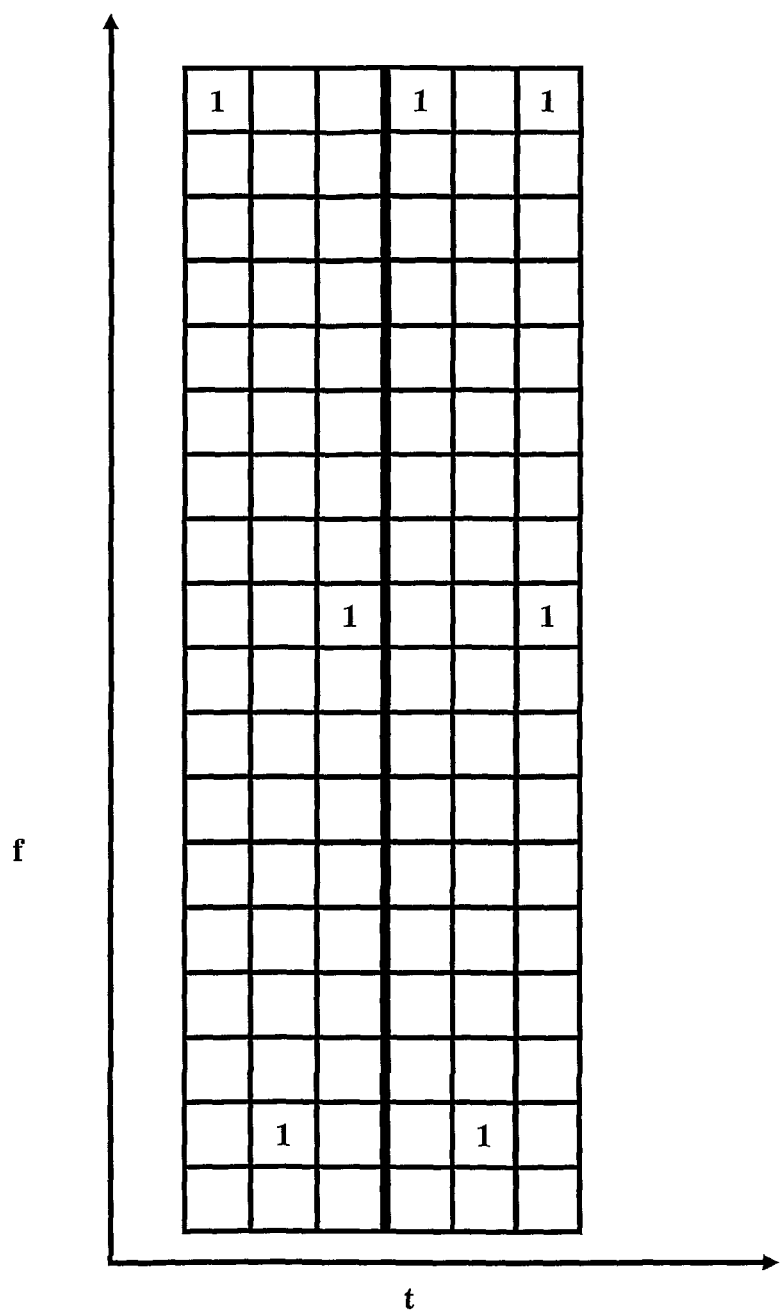
FIG. 5 illustrates an example of RB or PRU structure used in DL of 16m, according to embodiments as disclosed herein.

In the downlink of IEEE 802.16m, the basic packet resource unit (PRU) may is composed of 18 subcarrier and 6 OFDM symbols. DL of 16m uses OFDMA. FIG. 5 illustrates an example of RB or PRU structure used in DL of 16m. In each PRU certain subcarriers are reserved for pilot tones which are used for estimating the channel between the transmitter and receiver. The resource allocated to a user or a group of users will be in multiple of the basic resource units, and it can be either contiguous or distributed. N1 contiguous basic resource unit is called as sub-band, and N2 contiguous resource unit is called as miniband in IEEE 802.16m standards. N1 and N2 are positive integers. Typical number for N1 is 3 or 4 or 5 and N2 is 1 or 2.

Embodiments herein disclose the following STBC/SFBC based general structure for $N_T$ antennas:

$$y = W(p, q) \begin{bmatrix} s_{k,1} & -s_{k,2}^* \\ s_{k,2} & s_{k,1}^* \end{bmatrix}$$

where the elements of the matrix on the right hand side form STBC/SFBC block code, which contains two distinct modulation symbols and the columns of this matrix may span either two subcarriers (i.e., Space Frequency Block Code—SFBC) or two distinct OFDM symbols (Space Time Block Code—STBC). Further, the STBC/SFBC matrix may be transposed or permuted to get a different orthogonal matrix, or in general it can be any orthogonal matrix. The precoding matrix W(p,q) is $N_T \times 2$ matrix with complex and/or real elements or a combination. The precoder is fixed for a slot and it may take a new value in another slot which spans the two dimensional time frequency grid. The elements of y will be transmitted from all antennas simultaneously In an embodiment the precoding matrices W(p,q) can be obtained from a code book C which is obtained by taking either unit modulus elements, or vectors from certain code book In systems with 4-transmit antennas, the following simplified technique which concatenates STBC/SFBC with 2D-precoder can be utilized as shown below. The output is represented as $$A1 = \begin{bmatrix} s_{k,1}w_1(p,q)e^{j\Phi_1(p,q)} & -s_{k,2}^*w_1(p,q)e^{j\Phi_1(p,q)} \\ s_{k,2}w_1(p,q)e^{j\psi_1(p,q)} & s_{k,1}^*w_1(p,q)e^{j\psi_1(p,q)} \\ s_{k,1}w_2(p,q)e^{j\Phi_2(p,q)} & -s_{k,2}^*w_2(p,q)e^{j\Phi_2(p,q)} \\ s_{k,2}w_2(p,q)e^{j\Psi_2(p,q)} & s_{k,1}^*w_2(p,q)e^{j\Psi_2(p,q)} \end{bmatrix}$$

Where $s_{k,1}$, $s_{k,2}$ denotes the data/pilot transmitted on the $k^{th}$ subcarrier contained in the (p,q)th slot, $w_j(p,q)$, $\Phi_j(p,q)$, $\Psi_j(p,q)$ j=1, 2 are the amplitude variation, phase rotation applied in the (p,q)th slot. The rows of the vector y will be transmitted simultaneously from antennas 1 and 2, respectively. In this scheme, the 2D amplitude and phase values can be kept constant during the slot and they may take new values in different slots, which span both time and frequency dimensions.

In this scheme, the amplitude weights $w_j(p,q)$ and slot dependent phase values $\Phi_j(p,q)$, $\Psi_j(p,q)$ j=1, 2 can be jointly chosen such that the total diversity benefit is maximized under all channel conditions including correlated, uncorrelated, and Rician channels.

Using appropriate choice of angles, the matrix may be simplified as $$A1 = \begin{bmatrix} s_{k,1}w_1(p,q) & -s_{k,2}^*w_1(p,q) \\ s_{k,2}w_1(p,q) & s_{k,1}^*w_1(p,q) \\ s_{k,1}w_2(p,q)e^{j\Phi_2(p,q)} & -s_{k,2}^*w_2(p,q)e^{j\Phi_2(p,q)} \\ s_{k,2}w_2(p,q)e^{j\Psi_2(p,q)} & s_{k,1}^*w_2(p,q)e^{j\Psi_2(p,q)} \end{bmatrix}$$

Sometimes in line-of-sight channels, the phase variations may lead to signal erasure. This situation can be avoided if the following is chosen:

$$\Psi(p,q)=\Phi(p,q)+\pi.$$

In an embodiment, the amplitude weights on both antennas are kept to unity and a constant phase offset is applied on the second antenna with respect to the first antenna, i.e., $w_1(p,q)=1$, $w_2(p,q)=1$ which results in STBC/SFBC+1D/2D phase-offset-diversity (POD) scheme.

In a given slot, the data contained in the rows of the matrices are transmitted from antennas 1, 2, 3, and 4 respectively. To obtain addition diversity advantage, the data in the various rows of the A1 matrix can be exchanged over all possible row exchanges or a subset of row exchanges.

The amplitude and phase weights may be chosen from the set S1 which is designed for 2-antenna weighing case. Any one of the 1D/2D precoding vectors designed for single stream transmission can be used.

A 4-ant single stream slot wise antenna grouping/switching has been described herein. For single stream transmission in systems with 4-antennas, STBC/SFBC encoded slots are switched between different pairs of antenna in time, frequency or a combination of both. As shown in Tables 1 and 2, from slot to slot, the STBC/SFBC encoded data is transmitted through an antenna pair which is switched to a different combination in the time-frequency plane. Embodiments disclosed herein can be generalized to any number of antennas.

TABLE 1

| A1 | A2 | A3 |
|---|---|---|
| Slot (1, 1) STBC/SFBC code | Slot (1, 2) STBC/SFBC code | Slot (1, 3) STBC/SFBC code |
| transmitted on antennas (1, 2) | transmitted on antennas (1, 3) | transmitted on antennas (1, 4) |
| Slot (2, 1) STBC/SFBC code transmitted on antennas (3, 4) | Slot (2, 2) STBC/SFBC code transmitted on antennas (2, 4) | Slot (2, 3) STBC/SFBC code transmitted on antennas (3, 2) |

TABLE 2

| | | |
|---|---|---|
| A1 | Slot (1, 1) STBC/SFBC code transmitted on antennas (1, 2) | Slot (1, 2) STBC/SFBC code transmitted on antennas (3, 4) |
| A2 | Slot (2, 1) STBC/SFBC code transmitted on antennas (1, 3) | Slot (2, 2) STBC/SFBC code transmitted on antennas (2, 4) |
| A3 | Slot (3, 1) STBC/SFBC code transmitted on antennas (1, 4) | Slot (3, 2) STBC/SFBC code transmitted on antennas (3, 2) |

In another embodiment, the STBC/SFBC scheme may be concatenated with CDD and POD. In addition to slot dependent phase rotation, CDD may be applied along with phase rotation as described below. The phase rotation is preferably done in time. This scheme may be suitable for distributed allocations. In matrix form:

$$A1 = \begin{bmatrix} s_{k,1} & -s_{k,2}^* \\ s_{k,2} & s_{k,1}^* \\ s_{k,1}e^{j2\pi k \Delta fD1}e^{j\Phi1(q)} & -s_{k,2}^*e^{j2\pi k \Delta fD1}e^{j\Phi1(q)} \\ s_{k,2}e^{j2\pi k \Delta fD2}e^{j\Psi1(q)} & s_{k,1}^*e^{j2\pi k \Delta fD2}e^{j\Psi1(q)} \end{bmatrix}$$

To obtain addition diversity advantage, the data in the various rows of the A1 matrix can be exchanged over all possible permutations. One specific example permutation is given by:

$$A2 = \begin{bmatrix} s_{k,1} & -s_{k,2}^* \\ s_{k,1}e^{j2\pi k \Delta fD1}e^{j\Phi2(q)} & -s_{k,2}^*e^{j2\pi k \Delta fD1}e^{j\Phi2(q)} \\ s_{k,2} & s_{k,1}^* \\ s_{k,2}e^{j2\pi k \Delta fD2}e^{\varphi\Psi2(q)} & s_{k,1}^*e^{j2\pi k \Delta fD2}e^{j\Psi2(q)} \end{bmatrix}$$

$$A3 = \begin{bmatrix} s_{k,1} & -s_{k,2}^* \\ s_{k,2}e^{j2\pi k \Delta fD2}e^{j\Psi3(q)} & s_{k,1}^*e^{j2\pi k \Delta fD2}e^{j\Psi3(q)} \\ s_{k,2} & s_{k,1}^* \\ s_{k,1}e^{j2\pi k \Delta fD1}e^{j\Phi3(q)} & -s_{k,2}^*e^{j2\pi k \Delta fD1}e^{j\Phi3(q)} \end{bmatrix}$$

For example, in matrix A1, a circular delay of D1 samples is applied together with a slot dependent phase rotation on antenna-2 and a circular display of D2 samples on antenna-4, together with another slot dependent phase. The slot dependent phase may be a function of time only since delay will provide phase variations in frequency direction. The phase values may be chosen as:

$\Psi(p,q)=\Phi(p,q)\cdot{+\Pi},\Psi2(p,q)=\Phi2(p,q)\cdot{+\Pi}$ and $\Psi3(p,q)=\Phi3(p,q)\cdot{+\Pi}$ The embodiments as disclosed herein may be extended to arbitrary number of antennas by concatenating STBC/SFBC with 2D-POD or CDD+POD.

The embodiments disclosed herein can be utilized with common or dedicated pilots. In case of dedicated pilots, the pilots can be interspersed with data and they are transmitted from both antennas with slot specific 2D-precoding. Pilot structures which are designed for conventional 2-antenna STBC/SFBC systems can be used with this scheme, independent of number of used transmit antennas. Therefore, the proposed technique reduces pilot density considerably over techniques which require pilot transmission over all antennas.

The receiver performs channel estimation in (virtual) STBC/SFBC mode. Therefore, scheme has lower implementation complexity, in addition to the performance advantage offered by the 1D or 2D precoding. Demodulation and decoding can be done using conventional STBC/SFBC detection techniques.

Embodiments herein disclose the following general structure for 2-stream SM with $N_T$ antennas:

$$y = W(p,q) \begin{bmatrix} s_{k,1} \\ s_{k,2} \end{bmatrix}$$

where the elements of vector on the right hand side contain two modulation symbols which are transmitted simultaneously. The precoding matrix $W(p,q)$ is $N_T \times 2$ matrix with complex and/or real elements or a combination of both. In an embodiment, the precoding matrices $W(p,q)$ can be obtained from a code book C which is obtained by taking either unit modulus elements, or vectors from certain code book which maximizes the diversity gain and throughout. To transmit two data steams across 4 antennas, the following precoding matrices are proposed.

$$B1 = \begin{bmatrix} s_{k,1} w_1(p,q) e^{j\Phi_1(p,q)} \\ s_{k,2} w_1(p,q) e^{j\Phi_1(p,q)} \\ s_{k,1} w_2(p,q) e^{j\Phi_2(p,q)} \\ s_{k,2} w_2(p,q) e^{j\Psi_2(p,q)} \end{bmatrix}$$

Alternatively, the simplified B1 matrix with appropriate choices of phases may be used.

$$B1 = \begin{bmatrix} s_{k,1} w_1(p,q) \\ s_{k,2} w_1(p,q) \\ s_{k,1} w_2(p,q) e^{j\Phi_2(p,q)} \\ s_{k,2} w_2(p,q) e^{j\Psi_2(p,q)} \end{bmatrix}$$

The amplitude and phase weights may be chosen from the set S which is given for 2-antenna weighing case.

In an embodiment, the amplitude weights on both antennas are kept to unity and a constant phase offset is applied on the second antenna with respect to the first antenna, i.e., $w_1(p,q)=1$, $w_2(p,q)=1$ which results in SM+1D/2D phase-offset-diversity (POD) scheme.

To obtain addition diversity advantage, the data in the various rows of the B1 matrix can be exchanged over all possible row exchanges or a subset of row exchanges.

The SM+precoding technique can be generalized for any number of antennas by applying a suitably chosen precoder of size $N_T \times N_i$ where $N_i$ is the number of data streams.

A 4-ant two stream slot wise antenna grouping/switching scheme has been described herein. For two stream transmission in systems with 4-antennas, spatially multiplexed (SM) encoded slots are switched between different pairs of antenna in time, frequency or a combination of both. As shown in Table 3, from slot to slot, the SM encoded data is transmitted through an antenna pair which is switched to a different combination in time-frequency plane. The proposed method can be generalized to any number of antennas.

TABLE 3

| B1 | B2 | B3 | B4 | B5 | B6 |
|---|---|---|---|---|---|
| Slot (1, 1) 2-stream SM data transmitted on antennas (1, 2) | Slot (1, 2) 2-stream SM data transmitted on antennas (1, 3) | Slot (1, 3) 2-stream SM data transmitted on antennas (1, 4) | Slot (1, 4) 2-stream SM data transmitted on antennas (2, 1) | Slot (1, 5) 2-stream SM data transmitted on antennas (3, 1) | Slot (1, 6) 2-stream SM data transmitted on antennas (4, 1) |
| Slot (2, 1) 2-stream SM data transmitted on antennas (3, 4) | Slot (2, 2) 2-stream SM data transmitted on antennas (2, 4) | Slot (2, 3) 2-stream SM data transmitted on antennas (3, 2) | Slot (2, 4) 2-stream SM data transmitted on antennas (4, 3) | Slot (2, 5) 2-stream SM data transmitted on antennas (4, 2) | Slot (2, 6) 2-stream SM data transmitted on antennas (2, 3) |

In addition to slot dependent phase rotation, CDD may be applied along with phase rotation as described below. The phase rotation is preferably done in time. This scheme may be suitable for distributed allocations.

$$B1 = \begin{bmatrix} s_{k,1} \\ s_{k,2} \\ s_{k,1} e^{j2\pi k \Delta fD1} e^{j\Psi(q)} \\ s_{k,2} e^{j2\pi k \Delta fD2} e^{j\Psi(q)} \end{bmatrix}$$

$$B2 = \begin{bmatrix} s_{k,2} \\ s_{k,1} \\ s_{k,2} e^{j2\pi k \Delta fD2} e^{j\Psi 2(q)} \\ s_{k,1} e^{j2\pi k \Delta fD1} e^{j\Psi 2(q)} \end{bmatrix}$$

$$B3 = \begin{bmatrix} s_{k,1} \\ s_{k,1} e^{j2\pi k \Delta fD1} e^{j\Phi 3(q)} \\ s_{k,2} \\ s_{k,2} e^{j2\pi k \Delta fD2} e^{j\Psi 3(q)} \end{bmatrix}$$

$$B4 = \begin{bmatrix} s_{k,2} \\ s_{k,2} e^{j2\pi k \Delta fD2} e^{j\Psi 4(q)} \\ s_{k,1} \\ s_{k,1} e^{j2\pi k \Delta fD1} e^{j\Phi 4(q)} \end{bmatrix}$$

$$B5 = \begin{bmatrix} s_{k,1} \\ s_{k,2} \\ s_{k,2} e^{j2\pi k \Delta fD2} e^{j\psi 5(q)} \\ s_{k,1} e^{j2\pi k \Delta fD1} e^{j\Phi 5(q)} \end{bmatrix}$$

$$B6 = \begin{bmatrix} s_{k,2} \\ s_{k,1} \\ s_{k,1} e^{j2\pi k \Delta fD1} e^{j\Phi 6(q)} \\ s_{k,2} e^{j2\pi k \Delta fD2} e^{j\Phi 6(q)} \end{bmatrix}$$

In a preferred embodiment the phase values may be chosen as:

$$\Psi(q)=\Phi(q)\cdot{}^{+\Pi}, \Psi 2(q)=\Phi 2(q)\cdot{}^{+\Pi}, \Psi 3(q)=\Phi 3(q)\cdot{}^{+\Pi}, \Psi 4(q)=\Phi 4(q)\cdot{}^{+\Pi},$$

$$\Psi 5(q)=\Phi 5(q)\cdot{}^{+\Pi}, \Psi 6(q)=\Phi 6(q)\cdot{}^{+\Pi}$$

Embodiments disclosed herein can be extended to three stream transmission by concatenating SM with 2D-POD or CDD+POD for any number of antennas.

Embodiments disclosed herein can be utilized with common or dedicated pilots. In case of dedicated pilots, the pilots can be interspersed with data and they are transmitted from both antennas with slot specific 2D-precoding. Pilot structures which are designed for conventional SM systems can be used with this scheme. The receiver performs channel estimation in (virtual) SM mode. Therefore, scheme has lower implementation complexity. Demodulation and decoding can be done using conventional SM detection techniques e.g., MMSE, MLD, Successive cancellation etc.

Embodiments disclosed herein can be utilized with common or dedicated pilots. Common pilots or shared pilots are defined as pilots, which are common to all users or a group of users. When the system uses shared pilots, the subcarriers in a given PRU are shared by a group of users while the pilot tones are common to the group. In this case, all the users which use the shared pilots may use the same multiple antenna precoder for both data and pilot tones in that PRU.

In some systems, the data tones may be precoded using a PRU specific precoder while the pilot tones may not use precoding. In that case the system may train each antenna using distinct pilots which are specific to that antenna.

Dedicated pilots are defined as user specific pilots. In case of dedicated pilot transmission, the pilots can be interspersed along with data and they are transmitted using the same precoder as that of data.

Figure 6:
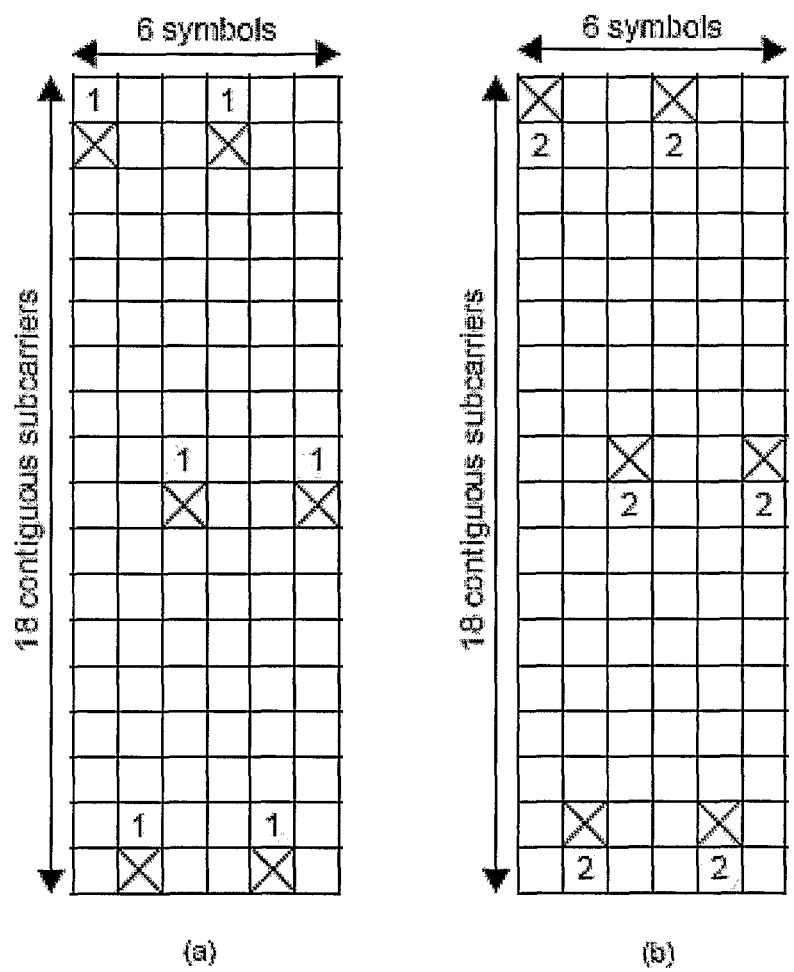
FIG. 6 depicts pilot patterns used for 2 DL data streams for SFBC or SM, according to embodiments as disclosed herein.

Example pilot patterns used for two DL data streams (SFBC or SM with precoding) in dedicated and common pilot scenarios are shown in FIG. 6, with the subcarrier index increasing from top to bottom and the OFDM symbol index increasing from left to right. The numbers on the pilot locations indicate the stream they correspond to. Subfigure (a) and Subfigure (b) in FIG. 6 are used for first data stream and second data stream 1, respectively, where 'X' stands for the null symbol, which means that no pilot or data is allocated on that time-frequency resource. This pattern is employed in IEEE 802.16m standard.

Figure 7:
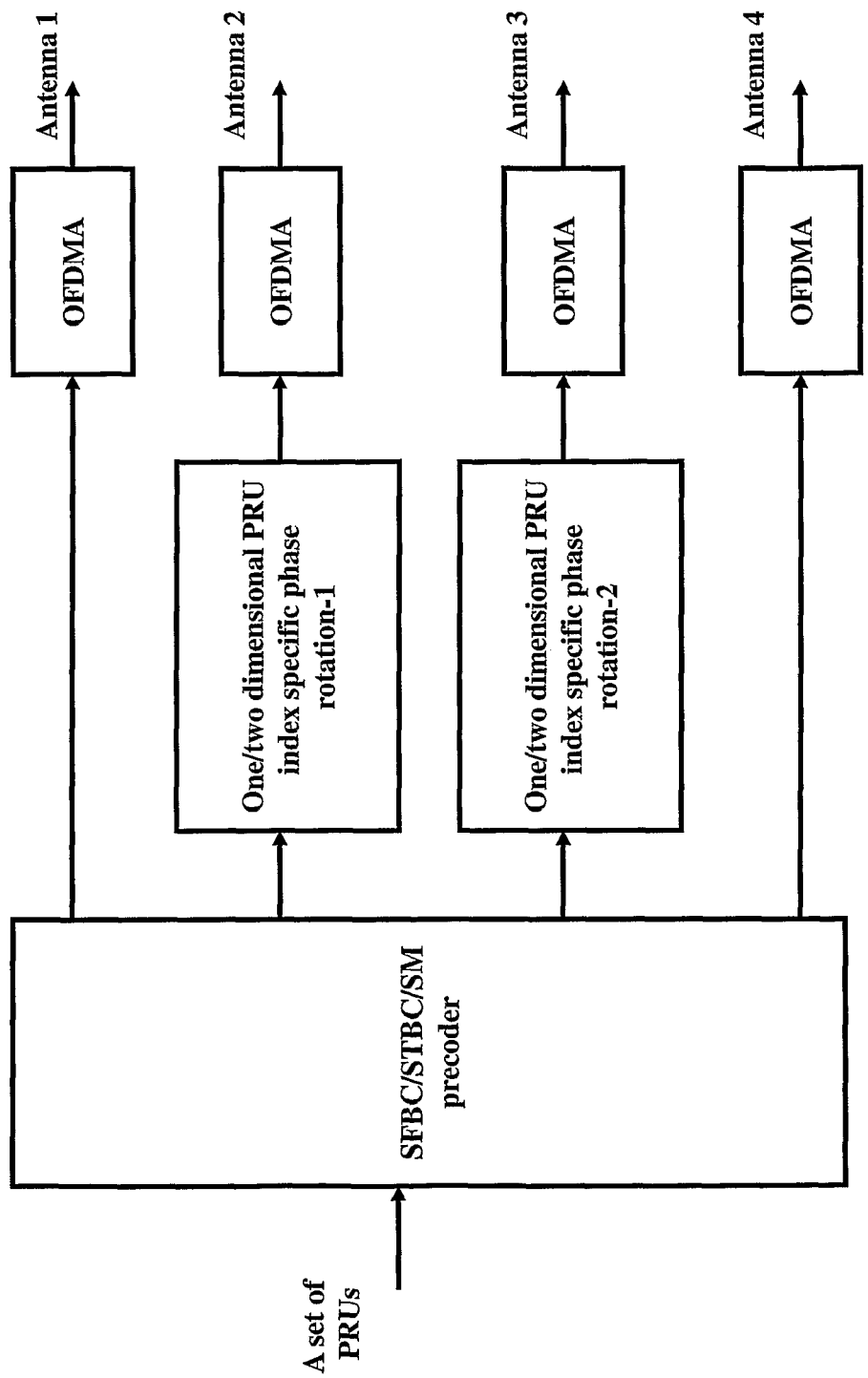
FIG. 7 depicts a SFBC/STBC/SM system with 2D-POD, according to embodiments as disclosed herein.

In an embodiment shown in FIG. 7, SFBC or SM encoding is applied on the input data contained in each PRU. The SFBC or SM encoder gives multiple outputs which are transmitted on distinct antennas after applying standard OFDMA operations. A PRU specific 1D/2D phase rotation is applied on the first and second outputs of SFBC or SM encoder output and each signal is transmitted on different antenna after applying standard OFDMA operations.

Figure 8:
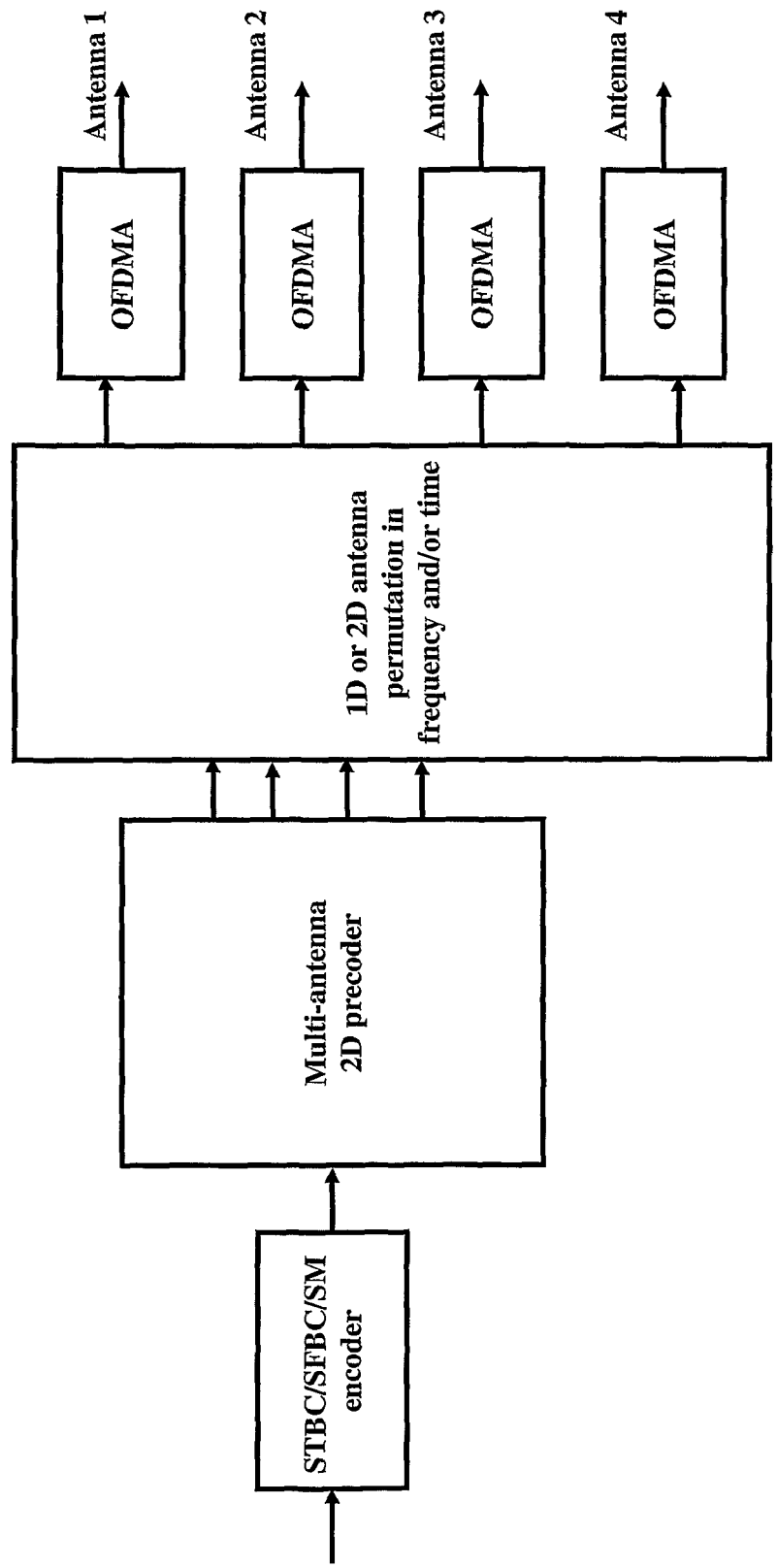
FIG. 8 depicts a SFBC/STBC/SM system with 2D-precoding and antenna permutation, according to embodiments as disclosed herein.

In FIG. 8, the SFBC or SM encoder output is further precoded using a precoder matrix to obtain multiple outputs. The multiple outputs are transmitted on different antenna after applying standard 0'-DMA operations. The mapping of precoded output signals to antenna branches may be varied in frequency or time. The variation may be applied at PRU level.

All the above mentioned techniques can be generalized for more than 4-antennas case.

Figure 9:
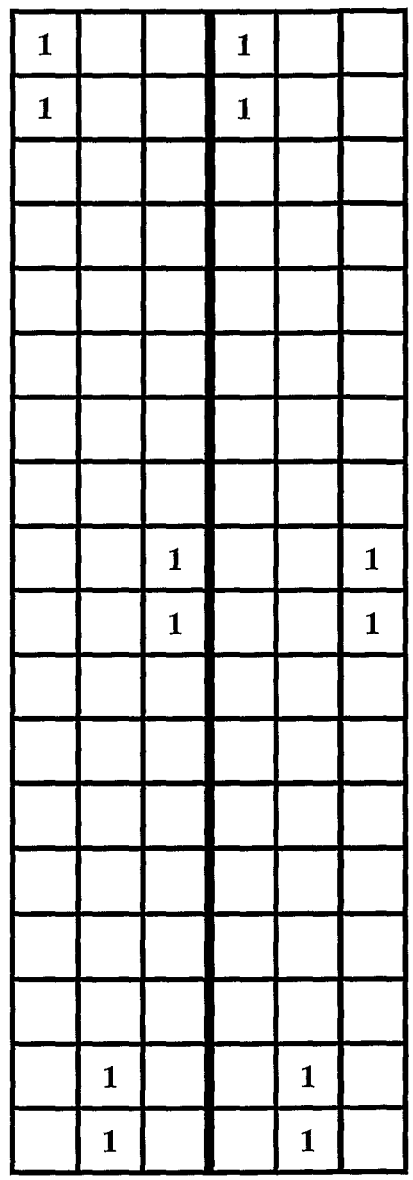
FIG. 9 depicts a PRU structure with 12-pilots, according to embodiments as disclosed herein.

FIG. 9 illustrate the PRU structure with 2-stream pilots which are suitable for SFBC or SM with precoding. The pilot tones which are allocated in pairs are utilized for sending two stream precoded pilots.

In the following, a technique which uses either a physical PRU index in frequency axis or logical PRU index indices to determine the precoder for a given PRU has been disclosed.

In an embodiment herein, the available bandwidth is divided into a number of frequency partitions. A frequency partition $FP_i$, $i=0, 1, 2, \ldots, N_p$ consists of a total of $N_{PRU}$ PRUs which may include localized and/or distributed resource units. The frequency spacing between distributed units is arbitrary.

If a given frequency partition contains distributed PRUs, and if precoder selection is done based on physical subcarrier index or physical PRU index, the allocated precoder sequence does not follow the desired periodic pattern. Such as scheme looses diversity gain in channels with low frequency selectivity. Moreover, if a given frequency partition contains a mix of sub-bands and mini-bands, it may not be possible to define the precoders for both sub-bands and mini-bands using PRU index as the basis.

In an embodiment herein, each PRU in a given frequency partition is assigned a logically contiguous PRU index "i" which ranges from $0, 1, 2, \ldots, N_{PRU}-1$. The index "i" is assigned in the increasing order starting from first to last PRU in that frequency partition. Note that indexing is done before subcarrier per mutation if DRUs are present in that frequency partitions. In some embodiments the PRU index "i" may correspond to physically contiguous PRUs. The precoder may be defined for each PRU in that partition based on the logical PRU index.

In each frequency partition, the indexing may be done for subbands and mini-bands separately. In other words, all the subbands and minibands are treated as separate sub partitions within a frequency partitions for the purpose of precoder allocation. In an alternative implementation, the subbands and a first set of minibands are utilized localized resource allocations and a second set of mini-bands are allocated for subcarrier permuted distributed allocations. In that case, the frequency partition consists of three separate sub-partitions.

If subbands are used in that frequency partition, each subband is allocated an index $i_{subband}$ which ranges from 0, 1, 2, ..., $N_{subbands}-1$. $N_{subbands}$ is the total number of subbands in the frequency sub partition.

If the first set of mini-band are utilized for localized allocations, in that frequency partition, each miniband in that first set is allocated an index $i_{miniband\ 1}$ which ranges from 0, 1, 2, ..., $N_{miniband\ 1}-1$. $N_{miniband\ 1}$ is the total number of minibands in the frequency sub partition.

If a second set of mini-band are utilized for the purpose of subcarrier permuted allocations, each miniband in that second set is allocated an index $i_{miniband\ 2}$ which ranges from 0, 1, 2, ..., $N_{miniband\ 2}-1$. $N_{miniband\ 2}$ is the total number of minibands in second set in that frequency sub partition In some implementations, the first and seconds sets of minibands can be combined and they can be assigned an index $i_{miniband}$ which ranges from 0, 1, 2, ..., $N_{miniband}-1$. $N_{miniband}$ is the total number of mini-bands in the frequency sub partition.

In each sub-partition, precoder allocation can be defined using a predefined method. This type of sub-partition specific dependent indexing makes precoder allocation more efficient especially if system contains a mixture of subbands and mini-bands. For subbands, The precoder is kept constant for all N1 successive PRUs contained in each subband. Preferred values for N1 are 3, or 4, or 5. For mini-bands, the precoder is kept constant for N2 successive PRUs contained in each miniband. Preferred values for N2 are 1, or 2.

In each sub partition, a precoding matrix W of size Nt×1 which is applied in each subband or miniband with frequency index "i", and sub-frame index "v", is determined from a code book C as: W=C(m).

For 1D-precoding "m" is defined as: m=mod [u,M]+1. For 2-D precoding "m" is defined as: m=mod [(u+v),M]+1, where M is the size of code book C, u=mod(i,M)+1. "v" is the subframe number.

In the above mentioned embodiment, the precoder which is implemented in a PRU depends on index "i" of the subband, or mini-band to which it belongs, and the subframe index "v". In 2D-precoding, the sum of index "i" in frequency and the subframe index "v" are used to decide the precoder which is applied in that PRU. In 1D-precoding, the PRU index "i" in frequency is used to decide the precoder which is applied in that subband or miniband. In an alternative embodiment for 2D precoding, the precoding matrix W may be chosen as: W=C(m).C(n) where the notation C(m).C(n) denotes element-wise multiplication of the two matrices/vectors, and m=mod [u,M]+1, n=mod [v,M]+1.

For 4-Tx precoding, the code book may be chosen as:

$$C(1) = \frac{1}{\sqrt{4}}\begin{bmatrix} 1 & 1 \\ 1 & j \\ 1 & -1 \\ -1 & j \end{bmatrix},$$

$$C(2) = \frac{1}{\sqrt{4}}\begin{bmatrix} 1 & 1 \\ -1 & -j \\ 1 & -1 \\ 1 & -j \end{bmatrix},$$

$$C(3) = \frac{1}{\sqrt{4}}\begin{bmatrix} 1 & 1 \\ j & -1 \\ -1 & 1 \\ j & 1 \end{bmatrix},$$

$$C(4) = \frac{1}{\sqrt{4}}\begin{bmatrix} 1 & 1 \\ -1 & -j \\ 1 & -1 \\ 1 & -j \end{bmatrix}$$

In alternative implementation, a precoder W is applied in a PRU with two dimensional indices (p,q) where W(p,q)=W(p).W(q) where the notation W(p).W(q) denotes element wise multiplication of two vectors/matrices. The notation (p,q) denotes the index of the physical resource unit (PRU) in two dimensional frequency-time planes, where 'p' denotes PRU index along frequency, and 'q' denotes index in time dimension. The index "p" may be a physical PRU index or a logical index.

W(p)=C(m), where m=mod(p,M)+1 where M is the size of code book

W(q)=C1(n), where n=mod(q,sM1)+1 where M1 is the size of code book C1, where r and s take any value greater than or equal to 1.

In 1D implementation, W(p,q)=W(p)

The entries of the code book C for M=4 are given by:

$$C(1) = \frac{1}{\sqrt{4}}\begin{bmatrix} 1 & 0 \\ 0 & 1 \\ 1 & 0 \\ 0 & 1 \end{bmatrix},$$

$$C(2) = \frac{1}{\sqrt{4}}\begin{bmatrix} 1 & 0 \\ 0 & 1 \\ -1 & 0 \\ 0 & -1 \end{bmatrix},$$

$$C(3) = \frac{1}{\sqrt{4}}\begin{bmatrix} 1 & 0 \\ 0 & 1 \\ j & 0 \\ 0 & j \end{bmatrix},$$

$$C(4) = \frac{1}{\sqrt{4}}\begin{bmatrix} 1 & 0 \\ 0 & 1 \\ -j & 0 \\ 0 & -j \end{bmatrix}$$

In an embodiment, the elements of the code book C can be arranged in any order. The entries of the code book C1 for M1=2 are given by:

The entries of the code book C for M=4 in 8-Tx SFBC/SM+precoding are given by:

$$C(1) = \frac{1}{\sqrt{8}} \begin{bmatrix} 1 & 0 \\ 0 & 1 \\ 1 & 0 \\ 0 & 1 \\ 1 & 0 \\ 0 & 1 \\ 1 & 0 \\ 0 & 1 \end{bmatrix},$$

$$C(2) = \frac{1}{\sqrt{8}} \begin{bmatrix} 1 & 0 \\ 0 & 1 \\ -1 & 0 \\ 0 & -1 \\ 1 & 0 \\ 0 & 1 \\ -1 & 0 \\ 0 & -1 \end{bmatrix},$$

$$C(3) = \frac{1}{\sqrt{8}} \begin{bmatrix} 1 & 0 \\ 0 & 1 \\ 1 & 0 \\ 0 & 1 \\ -1 & 0 \\ 0 & -1 \\ -1 & 0 \\ 0 & -1 \end{bmatrix},$$

$$C(4) = \frac{1}{\sqrt{8}} = \begin{bmatrix} 1 & 0 \\ 0 & 1 \\ -1 & 0 \\ 0 & -1 \\ -1 & 0 \\ 0 & -1 \\ 1 & 0 \\ 0 & 1 \end{bmatrix}$$

In an embodiment, the elements of the code book C can be arranged in any order. The entries of the code book C1 for M1=4 are given by:

$$C1(1) = \begin{bmatrix} 1 & 1 \\ 1 & 1 \\ 1 & 1 \\ 1 & 1 \\ 1 & 1 \\ 1 & 1 \\ 1 & 1 \\ 1 & 1 \end{bmatrix},$$

$$C1(2) = \begin{bmatrix} 1 & 1 \\ 1 & 1 \\ 1 & 1 \\ 1 & 1 \\ -1 & -1 \\ -1 & -1 \\ -1 & -1 \\ -1 & -1 \end{bmatrix},$$

$$C1(3) = \begin{bmatrix} 1 & 1 \\ 1 & 1 \\ -1 & -1 \\ -1 & -1 \\ 1 & 1 \\ 1 & 1 \\ -1 & -1 \\ -1 & -1 \end{bmatrix},$$

$$C1(4) = \begin{bmatrix} 1 & 1 \\ 1 & 1 \\ -1 & -1 \\ -1 & -1 \\ -1 & -1 \\ -1 & -1 \\ 1 & 1 \\ 1 & 1 \end{bmatrix}$$

More generally, the code book C1 can be obtained from C by using a permutated version of the code book C. The permutation sequence can be obtained by taking the code book indices of C i.e., 1, 2, ... M and write them in binary form after subtracting 1 from each index For M=4, the indices are represented as (00), (01), (10), (11). Rewrite the indices in bit reversal order i.e. for M=4, now we have (00), (10), (01), (11) which becomes 0, 2, 1, 3. Add 1 to entry. The permutation sequence now becomes 1,3,2,4. Use this permutation sequence to permute the code book C. The elements of code book C1 are given by C(1), C(3), C(2), C4). This technique can be generalized applied to any code book C to obtain the permuted code book C1.

In all the above embodiments the OFDM symbols which carry the data and pilot signals are transmitted using the same precoder. The precoder is kept constant for either a single time slot, pair of slots or more. Keeping the precoders constant in time is useful for enhancing the channel estimation and interference covariance estimation.

Figure 10:
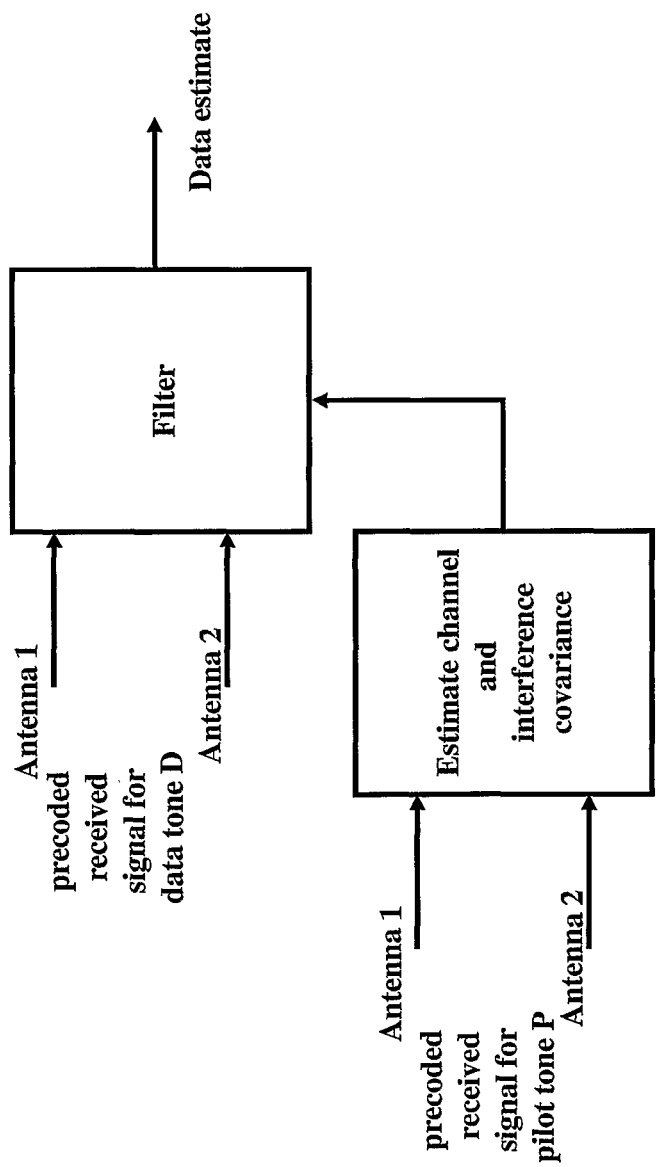
FIG. 10 illustrates the baseband portion of the OFDM receiver, according to embodiments as disclosed herein.

FIG. 10 illustrates the baseband portion of the OFDM receiver for demodulating SFBC+precoder or SM+precoded signals. Precoded pilot tones are used to estimate the channel state information and interference covariance estimation. A filter is used to demodulate the precoded data tones. The filter weights are computed using the estimated channel and estimated interference covariance. In typical implementations, the receiver processes each PRU independently using SFBC or SM decoder.

The embodiments disclosed herein can be implemented through at least one software program running on at least one hardware device and performing network management functions to control the network elements. The network elements shown in FIGS. 1, 2, 3 and 10 include blocks which can be at least one of a hardware device, or a combination of hardware device and software module.

The embodiment disclosed herein describes a general method that transmits signal from multiple antennas using a one/two dimensional precoder followed by STBC/SFBC or SM encoder. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for transmission of a signal stream from a plurality of antennas, said method comprising:
creating a plurality of groups of consecutive symbols in said stream;
applying a transformation to at least one of each of said plurality of groups, wherein each of transformed plurality of groups comprises of one or more elements;
creating a matrix T from said elements of each of said transformed plurality of groups, wherein said matrix T is a at least one of space time or space frequency encoding matrix of size $N_i \times N_s$, where $N_i$ is number of elements in said group;
applying a precoder to said matrix T to create an $N_t \times N_s$ matrix;
mapping columns of said $N_t \times N_s$ matrix to a different subcarrier on a plurality of Physical Resource Units (PRUs), said plurality of PRUs having a common time index and a common frequency index; and
transmitting rows of said $N_t \times N_s$ matrix on said plurality of antennas, wherein each row of said $N_t \times N_s$ matrix uses a different antenna and wherein each column of said $N_t \times N_s$ matrix is transmitted using a different subcarrier on a Physical Resource Unit (PRU), wherein said precoder is a matrix of size $N_t \times N_i$, where $N_t$ is number of said plurality of transmitting antennas and further said precoder varies with at least one of
said time index;
said frequency index; and
said frequency and time indices.

2. The method as claimed in claim 1, wherein an input of at least one of data and pilots.

3. The method as claimed in claim 1, wherein said precoder is a predefined arbitrary matrix of size $N_t \times N_i$.

4. The method as claimed in claim 1, wherein said precoder W(p,q) for $N_t$=4 is $$W(p,q) = \begin{bmatrix} 1 & 0 \\ 0 & 1 \\ e^{j\Phi(p,q)} & 0 \\ 0 & e^{j\Psi(p,q)} \end{bmatrix},$$

wherein p is frequency index of said PRU, q is time index of said PRU, $\Psi(p,q)$ and $\Phi(p,q)$ are phase rotations.

5. The method as claimed in claim 4, wherein $\Psi(p,q)=\Phi(p,q)+\pi$.

6. The method as claimed in claim 4, wherein said phase rotation takes a value between 0 and $2\pi$ including 0 and $2\pi$.

7. The method as claimed in claim 4, wherein said phase rotation relies on at least one of said time index and said frequency index of said symbols, wherein said frequency index is at least one of a logical frequency index or physical frequency index.

8. The method as claimed in claim 1, wherein said precoder W(p,q) for $N_t$=4 takes values from the set $$W(p,q) \in \left( \begin{bmatrix} 1 & 0 \\ 0 & 1 \\ 0 & 0 \\ 0 & 0 \end{bmatrix}, \begin{bmatrix} 0 & 0 \\ 0 & 0 \\ 1 & 0 \\ 0 & 1 \end{bmatrix} \right).$$

9. The method as claimed in claim 1, wherein said transforming matrix T is at least one of a 2×2 matrix for Space Frequency Block Code (SFBC) and a 2×2 matrix for Space Time Block Code (STBC) and an Ni×1 matrix for Spatial Multiplexing (SM).

10. The method as claimed in claim 1, wherein said signal is at least one of an Orthogonal Frequency Division Multiple Access (OFDMA) signal and a DFT-S-OFDMA signal.

11. The method as claimed in claim 1, wherein said precoder is selected for a signal by:
dividing available bandwidth of streams of a frequency band into a plurality of frequency partitions, wherein said plurality of frequency partitions is further divided into a plurality of frequency subpartitions, each of said plurality of frequency sub-partitions comprising of a plurality of Physical Resource Units (PRUs);
grouping said plurality of PRUs into sets, wherein each said set comprise of an arbitrary number of PRUs;
classifying said sets into a plurality of sets, wherein elements of said sets comprises of L physically contiguous PRUs, wherein L is greater than or equal to 1 and L is configured to vary with each of said sets;
assigning to each element of said sets a logically contiguous index i, wherein i takes values from 0 to $N_L$−1, wherein $N_L$ is configured to vary for each of said sets;

determining a precoding matrix W(i,q) of size $N_t \times Nj$ for each element of a set chosen from said plurality of sets, wherein $N_t$ is a number of transmitting antennas; and applying a precoding matrix to each element of said set to obtain said precoder.

12. The method as claimed in claim 11, wherein i is assigned to each of said PRUs in increasing order.

13. The method as claimed in claim 11, wherein applying said precoding matrix to said element further comprises of applying said precoding matrix to said element with a precoder W(i,q) in each of said PRUs, wherein said precoder is dependent on i and subframe number v.

14. The method as claimed in claim 13, wherein determining said precoder W(i,q) further comprises of determining said precoder W(i,q) from a code book C as W(i,q)=C(m), further wherein C(m) is obtained using at least one of m=mod[(u+v),M]+1, or m=mod [u,M]+1, wherein M is size of said code book C, u=mod[(i, M)]+1.

15. The method, as claimed in claim 14 wherein said C is $$C(1) = \frac{1}{\sqrt{4}} \begin{bmatrix} 1 & 1 \\ 1 & j \\ 1 & -1 \\ -1 & j \end{bmatrix},$$

$$C(2) = \frac{1}{\sqrt{4}} \begin{bmatrix} 1 & 1 \\ -1 & -j \\ 1 & -1 \\ 1 & -j \end{bmatrix},$$

$$C(3) = \frac{1}{\sqrt{4}} \begin{bmatrix} 1 & 1 \\ j & -1 \\ -1 & 1 \\ j & 1 \end{bmatrix},$$

$$C(4) = \frac{1}{\sqrt{4}} \begin{bmatrix} 1 & 1 \\ -1 & -j \\ 1 & -1 \\ 1 & -j \end{bmatrix}.$$

16. The method as claimed in claim 14 wherein said C is C(I)=

$$C(1) = \frac{1}{\sqrt{4}} \begin{bmatrix} 1 & 0 \\ 0 & 1 \\ 1 & 0 \\ 0 & 1 \end{bmatrix},$$

$$C(2) = \frac{1}{\sqrt{4}} \begin{bmatrix} 1 & 0 \\ 0 & 1 \\ -1 & 0 \\ 0 & -1 \end{bmatrix},$$

$$C(3) = \frac{1}{\sqrt{4}} \begin{bmatrix} 1 & 0 \\ 0 & 1 \\ j & 0 \\ 0 & j \end{bmatrix},$$

-continued $$C(4) = \frac{1}{\sqrt{4}} \begin{bmatrix} 1 & 0 \\ 0 & 1 \\ -j & 0 \\ 0 & -j \end{bmatrix}.$$

17. The method as claimed in claim 11, wherein said precoding matrix is applied with a precoder W(i,q) in each of a plurality of sets, wherein each of said sets comprises of physically contiguous PRUs, wherein said precoder is dependent on at least one of only i and only q.

18. The method as claimed in claim 11, wherein said signal is configured to use at least one of an Orthogonal Frequency Division Multiple Access (OFDMA signal and a DFT-S-OFDMA signal.

19. A system for transmission of a signal from a plurality of antennas, said system comprising means for:

creating a plurality of groups of consecutive symbols in said stream;

applying a transformation to each of at least one of said plurality of groups, wherein each of transformed plurality of groups comprises of one or more elements;

creating a matrix T from each of said elements of each of said plurality of groups, wherein said matrix T is at least one of space time or space frequency encoding matrix of size $Ni \times Ns$, where Nj is number of elements in said group;

applying a precoder to said matrix T to create an $N_t \times N_s$ matrix;

mapping columns of said $N_t \times N_s$ matrix to a different subcarrier on a plurality of Physical Resource Units (PRUs), said plurality of PRUs having a common time index and a common frequency index; and transmitting rows of said $N_t \times N_s$ matrix on said plurality of antennas, wherein each row of said $N_t \times N_s$ matrix is configured to use a different antenna and wherein each column of said $N_t \times N_s$ matrix is configured to be transmitted using a different subcarrier on a Physical Resource Unit (PRU), further wherein said precoder is a matrix of size $N_t \times Nj$, wherein $N_t$ is a number of said plurality of transmitting antennas and further said precoder is configured to be kept constant for a slot and is configured to vary with at least one of said time index;

said frequency index; and said frequency and time indices.

20. The system as claimed in claim 19, wherein said system is configured to use a 2×2 matrix as said transforming matrix T for Space Frequency Block Code (SFBC) and for Space Time Block Code and an Ni×1 matrix for Spatial Multiplexing (SM).

21. The system as claimed in claim 19, wherein said system is configured to use at least one of an Orthogonal Frequency Division Multiple Access (OFDMA) signal and a Discrete Fourier Transform-Spread Orthogonal Frequency Division Multiple Access (DFT-S-OFDMA) signal.

22. The system as claimed in claim 19, for selection of said precoder for a signal, wherein said precoder is configured to be kept constant for a time slot, said system comprising means adapted for:

dividing available bandwidth of streams of a frequency band into a plurality of frequency partitions, wherein said plurality of frequency partitions is further divided into a plurality of frequency subpartitions, each of said plurality of frequency sub-partitions comprising of a plurality of Physical Resource Units (PRUs);

grouping said plurality of PRUs into sets, wherein each said set comprise of an arbitrary number of PRUs; classifying said sets into a plurality of sets, wherein elements of said sets comprise of L physically contiguous PRUs wherein L is greater than or equal to 1 and is configured to vary with each of said sets;

assigning to each element of said sets a logically contiguous index i, wherein i is configured to take values from 0 to $N_L-1$, wherein $N_L$ is configured to vary for each of said sets;

determining a precoding matrix W(i,q) of size $N_t \times N$; for each element of a set chosen from said plurality of sets, where $N_t$ is number of transmitting antennas;

applying a precoding matrix to each element of said set to obtain said precoder.

23. The system as claimed in claim 22, wherein said system is configured to assign i to each of said PRUs in increasing order.

24. The system as claimed in claim 22, wherein said system is configured to apply said precoding matrix with a precoder in each of said PRUs, wherein said precoder is dependent on i and subframe number v.

25. The system as claimed in claim 24, wherein said system is further configured to determine said precoder from a code book C as W(i,q)=C(m), further wherein C(m) is obtained using at least one of m=mod[(u+v),M]+1 or m=mod[u,M]+1, wherein M is size of said code book C, u=mod[(i,M)]+1.

26. The system as claimed in claim 22, wherein said system is configured to apply said precoding matrix with a precoder in each of a plurality of sets, wherein each of said sets comprises of physically contiguous PRUs, wherein said precoder is dependent on at least one of only i and only q.

27. The system as claimed in claim 22, wherein said system is configured to use at least one of an Orthogonal Frequency Division Multiple Access (OFDMA) signal and a Discrete Fourier Transform-Spread Orthogonal Frequency Division Multiple Access (DFT-S-OFDMA) signal.

28. The system as claimed in claim 19, for transmission using $N_t$ transmission antennas, said system further comprising atleast one means adapted for transmitting elements of y simultaneously from said $N_t$ antennas, where y=W(p,q)T, further wherein p is frequency index of y, q is time index of y and W(p,q) is a $N_t \times N_s$ vector and T is transformer matrix.

* * * * *